(12) United States Patent
Fells et al.

(10) Patent No.: US 6,363,187 B1
(45) Date of Patent: Mar. 26, 2002

(54) CHROMATIC DISPERSION COMPENSATION

(75) Inventors: Julian A Fells, Epping; Andrew J Collar, Bishop's Stortford; Howard N Rourke, Harlow, all of (GB)

(73) Assignee: Northern Telecom Limited, St. Laurent (CA)

( * ) Notice: Subject to any disclaimer, the term of this patent is extended or adjusted under 35 U.S.C. 154(b) by 0 days.

(21) Appl. No.: 09/385,939

(22) Filed: Aug. 30, 1999

(51) Int. Cl.[7] .................................................. G02B 6/34
(52) U.S. Cl. .............................. 385/37; 385/15; 385/31; 359/161
(58) Field of Search .............................. 385/37, 31, 15; 359/161, 127, 130

(56) References Cited

U.S. PATENT DOCUMENTS

| 4,953,939 A | | 9/1990 | Epworth |
| 5,701,188 A | * | 12/1997 | Shigematsu et al. ......... 359/161 |
| 5,982,963 A | * | 11/1999 | Feng et al. .................... 385/37 |
| 5,999,671 A | * | 12/1999 | Jin et al. ........................ 385/37 |
| 6,055,081 A | * | 4/2000 | Koyano et al. .............. 359/161 |

FOREIGN PATENT DOCUMENTS

| JP | 411183748 A | * | 7/1999 |
| JP | 2000028934 A | * | 1/2000 |

OTHER PUBLICATIONS

'Dispersion compensation in 20Gbit/s dynamic nonlinear lightwave systems using electricity unable chirped fibre grating' Electronics Letters May 13, 1999 vol. 35 No. 10 pp832–833 B J Eggleton et al.
'Dispersion Tuning of a Linearly Chirped Fiber Bragg Grating Without a Center Wavelength Shift by Applying a Strain Gradient' T.Imai et al IEEE Photonics Technology Letters vol. 10 No. 6, Jun. 1998 pp845–847.
'Dynamic dispersion Compensation in a 10Gbit/s Optical System Using a Novel Voltage Tuned Nonlinearly Chirped Fiber Bragg Grating' K.M.Feng et al IEEE Photonics Technology Letters vol. 11 No. 3 Mar. 1999 pp373–375.
TuM1 'Dispersion Compensation' Raymond Brad Kummer
TuM2 'Fabrication of nonlinearly chirped fiber Bragg gratings for higher–order dispersion compensation' T.Komukai et al. OFC '98 Technical Digest pp71–72.
'Long periodic superstructure Bragg gratings in optical fibres' B J Eggleton et al Electronics Letters Sep. 15, 1994 vol. 30 No. 19 pp1620–1622.
'30dB sampled gratings in germanosilicate planar waveguides' M Ibsen et al Electronics Letters Nov. 21, 1996 vol. 32 No. 24.

* cited by examiner

Primary Examiner—Rodney Bovernick
Assistant Examiner—Sung Pak
(74) Attorney, Agent, or Firm—Lee, Mann, Smith, McWilliams Sweeney & Ohlson

(57) ABSTRACT

An optical waveguide provided with a linearly chirped Bragg reflective grating can be employed as a device that provides linear dispersion compensation. The amount of the linear dispersion thereby provided can be rendered adjustable by adjustment of the magnitude of axial strain imposed upon the grating. If the chirp is purely linear, and if also, the strain is at all times uniform along the length of the grating, adjustment of the strain magnitude will have no such effect. This requires the presence of a quadratic chirp term, but such a term introduces its own transmission penalty. This penalty is compensated at least in part by causing the light to make a reflection in a further Bragg reflection grating whose quadratic component of chirp has the opposite sign to that of the other Bragg reflection grating, but a substantially matched modulus.

The effect of the strain is to scale the effective pitch of the Bragg reflection grating by scaling its physical pitch. An alternative way of achieving a similar effect is to change the effective refractive index of the waveguide in which the grating is formed, for instance by changing its temperature.

14 Claims, 6 Drawing Sheets

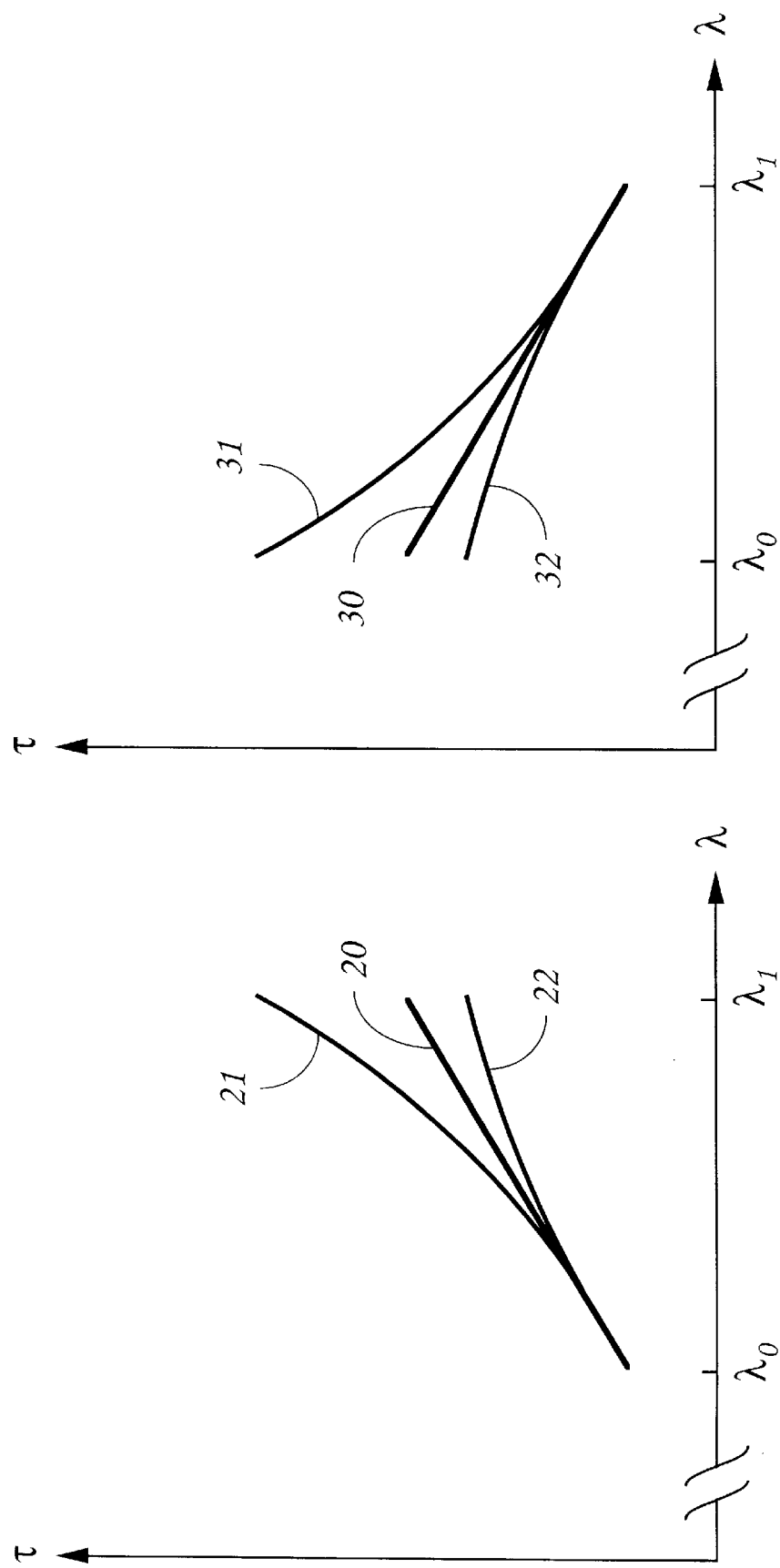

CHROMATIC DISPERSION COMPENSATION

FIELD OF THE INVENTION

This invention relates to the compensation of chromatic dispersion, hereinafter referred to as dispersion, in optical transmission systems.

Linear (first order) dispersion, D, is the measure of the rate of change of group delay, $\tau$, with wavelength, $\lambda$. ($D=d\tau/d\lambda$.) Linear dispersion is typically measured in picoseconds per nanometre (ps/nm). In the case of a transmission medium, for instance an optical fibre waveguide, whose waveguiding properties are uniform along its length, the linear dispersion exhibited by the medium is proportional to its length and so, for such a medium, it is convenient to define its linear dispersion per unit length, also known as its linear dispersion power. This is typically measured in picoseconds per nanometre per kilometre (ps/nm/km).

The value of the linear dispersion of a transmission path is generally itself a function of wavelength, and so there is a quadratic (second order) dispersion term, Q, also known as dispersion slope, which is a measure of the rate of change of linear dispersion with wavelength. ($Q=dD/d\lambda=d^2\tau/d\lambda^2$.) This is typically measured in picoseconds per nanometre squared (ps/nm$^2$). In some, but not all instances, the effects of quadratic dispersion in NDS and DC fibre (non dispersion shifted fibre, and dispersion compensating fibre) are small enough not to assume significance. There are also higher dispersion terms, whose effects generally assume even less significance.

BACKGROUND TO THE INVENTION

In a digital transmission system the presence of dispersion leads to pulse broadening, and hence to a curtailment of system reach before some form of pulse regeneration becomes necessary. The problem presented by dispersion increases rapidly with increasing bit rate. This is because, on the one hand, increasing the bit rate produces increased spectral broadening of the pulses, and hence increased dispersion mediated pulse broadening; while on the other hand, increasing the bit rate also produces a reduction in the time interval between consecutive bits. In a WDM (wavelength division multiplexed) digital transmission system, it is not practical to minimise the problems of dispersion by choosing to employ a transmission medium exhibiting near-zero first order dispersive power because low first order dispersive power is associated with aggravated non-linear (e.g. four-wave mixing) distortion. A known solution to this problem is to employ 'managed dispersion' in which near-zero aggregate linear dispersion over a particular transmission path is achieved by the use of alternating sections respectively exhibiting positive linear dispersion and negative linear dispersion, for instance by the use of NDS and DC optical fibre waveguide.

Having regard to the manufacturing tolerances in practice encountered in the fabrication of NDS and DC fibre, achieving adequately low aggregate linear dispersion becomes increasingly difficult as the bit rate is increased. Consider for instance a 40 Gbit/s WDM transmission system with a reach of 400 km, and with the shortest and longest wavelength channels separated by 200 nm. The actual amount of linear dispersion in any particular channel that can be tolerated will of course be dependent upon a number of system parameters, but typically may lie in the region of 100 ps/nm. A typical NDS fibre exhibits, at a wavelength of 1550 nm, a linear dispersive power of approximately 17 ps/(nm·km), and a quadratic dispersive power of approximately 0.058 ps/(nm$^2$·km). Currently DC fibre is fabricated to a tolerance of ±3% in respect of linear dispersive power, and a tolerance of ±20% in respect of quadratic dispersive power. Therefore, for the 400 km span length, the uncertainty in linear dispersion compensation at the 1550 nm wavelength will amount to approximately 400 ps/nm ($\approx$400×17×0.06 ps/nm).

Given the 200 nm wavelength range, the additional uncertainty at the wavelength extremities produced by the ±20% quadratic tolerance amounts approximately to a further 900 ps/nm ($\approx$400×0.058×200×0.2 ps/nm). To this must be added any uncertainty arising from any imprecision in the knowledge of the length and dispersion of the transmission fibre.

The foregoing indicates that, even if the DC fibre were manufactured to tolerances tightened by an order of magnitude, those tolerances would still be large enough to cause difficulty in achieving an accurate enough compensation for the reliable provision of an operating point near the centre of the 100 ps/nm window.

There is therefore a useful role for an adjustable amplitude linear dispersion compensation device. Such a device could be one designed for operation on its own to achieve the totality of dispersion compensation. Alternatively, it could be one designed for operation in association with a fixed amplitude dispersion compensation device, such as a length of DC fibre, that provides a level of compensation that is inadequately matched on its own. The adjustable device may be operated with some form of feedback control loop to provide active compensation that can respond to dynamic changes of dispersion within the system, and in suitable circumstances to step changes resulting from re-routing occasioned for instance by a partial failure of the system such as a transmission fibre break.

An alternative way of providing dispersion which may be used for dispersion compensation purposes utilises spectrally distributed reflection of light produced by a chirped Bragg grating extending in the axial direction of an optical waveguide. Such a method is for instance described in U.S. Pat. No. 4,953,939. Operating upon an optical waveguide with a Bragg reflective grating in such a way as to modify the pitch of its grating elements can have the effect of producing a change in the dispersion exhibited by that device, but in certain circumstances will not do so. Thus, if the starting point is a device with a uniform pitch Bragg grating, this device reflects light at the Bragg wavelength determined by that pitch, and the effect of the grating is not such as to impart any dispersion. If now the device is uniformly stretched, the magnitude of the pitch is changed, the Bragg reflection wavelength is changed, but the grating still does not impart any dispersion. A similar situation pertains if, instead of stretching the fibre to change the pitch of its grating elements, its effective pitch (the product of physical pitch with effective refractive index) is changed by a uniform heating of the grating. On the other hand, if the heating is not uniform, but is such as to produce a thermal gradient along the waveguide axis in the region of the grating, then the effect of this heating is to introduce chirp where none was present before, and hence is to introduce a measure of dispersion. Controlling the magnitude of the thermal gradient controls the magnitude of the resulting chirp, and thus there is provided a form of adjustable amplitude linear dispersion compensation device. Such a device is for instance described by B J Eggleton et al. in, 'Dispersion compensation in 20 Gbit/s dynamic nonlinear lightwave systems using electrically tunable chirped fibre grating', Electronics Letters Vol. 35, No. 10, pp 832–3. Similarly, if the waveguide is subjected to a stretching that is not uniform, but is such as to produce a strain gradient along the waveguide axis, then the effect is to produce a controllable amplitude of chirp where none was present before. One example of such a device, a device in which a strain gradient is imparted to an optical fibre waveguide by bonding a portion of its length to a cantilever, and then bending that cantilever, is described by T Imai et al. in, 'Dispersion Tuning of a Linearly Chirped Fiber Bragg Grating Without a Center Wavelength Shift by Applying a Strain Gradient', IEEE Photonics Technology Letters, Vol. 10, No. 6, pp 845–7. Another example of such a device, a device in which a strain gradient is imparted to an optical fibre by bonding it to the side of a stack of electrostrictive elements, and then applying a differential drive to those elements, is described in U.S. Pat. No. 5,694,501. In the thermal and both strain based examples there is a liability to problems arising from the fact that any significant change of chirp is associated with a change in reflectivity. In the case of the thermal example there are the additional problems of slow response and of maintaining a controlled temperature gradient in a system environment as opposed to a controlled laboratory environment. In the case of the cantilever device, there are problems associated with the bonding of the fibre adequately to the cantilever, and extraneous optical non-linearities are introduced by virtue of the fact that the radius of curvature is typically a non-linear function of distance along the cantilever. In the case of the piezoelectric stack device, there are similar bonding problems, and there are cost and reliability problems associated with the complexity of the stack and the differential drive requirements of the component elements.

It has already been explained why the uniform stretching of an optical waveguide possessing a uniform pitch Bragg reflection grating does not introduce any change is linear dispersion. It can additionally be seen that uniform stretching similarly produces a negligible change in linear dispersion if the grating is linearly chirped. However, as for instance disclosed by K -M Feng et al. in, 'Dynamic Dispersion in a 10-Gbit/s Optical System Using a Novel Voltage Tuned Nonlinearly Chirped Fiber Bragg Grating', IEEE Photonics Technology Letters, Vol. 11, No. 3, pp 373–5, the uniform stretching of an optical waveguide possessing a chirped Bragg grating with a quadratic component of its chirp does induce a change in the linear dispersion afforded by the structure.

The above-referenced paper by Feng et al. demonstrates, both in terms of eye diagram and BER measurement, how the use of their non-linearly chirped grating can be operated to reduce the receiver sensitivity penalty (increase in receiver signal power required to meet a given BER at 10 Gbit/s) of an uncompensated transmission system, and specifically attributes a residual receiver sensitivity penalty mainly to an imperfect compensation of the dispersion. We have determined that another factor is involved, namely that the presence of quadratic dispersion itself introduces a receiver sensitivity penalty.

It is for instance estimated that, in the case of a 40 Gbit/s NRZ system in which the quadratic dispersion amounts to only 40 ps/nm$^2$, this penalty may amount to about 0.25 dB, and that the penalty increases in an approximately linear fashion with increasing quadratic dispersion, at least as far as a quadratic dispersion of 300 ps/nm$^2$. This estimation is based on a simulation using a 128 bit Pseudo Random Bit Sequence generated with raised-cosine rising and falling edges. This is converted to an optical signal using the amplitude and phase response of a Mach-Zehnder modulator with symmetrical drive. The signal is then modified by the response of an optical fibre which can introduce quadratic dispersion across the modulation bandwidth. The resultant output from such a simulation is a pulse sequence, which is distorted in relation to the input pulse sequence. One way in which to assess the degradation is to overlay each received bit on top of its predecessors to generate an eye diagram. The actual method of assessing this eye diagram involves measuring quantitatively the amount of opening in the eye pattern. This figure is then compared to that of the system when there is no fibre in place. The ratio of these two figures is expressed in dB and quoted as a 'penalty'. The results of this estimation would prima facie suggest the choice of a grating with a low modulus quadratic chirp. However, for any given range of linear dispersion adjustment, a reduction in the modulus of quadratic chirp requires a corresponding increase in both grating length and the amount of strain required to sweep through that range. Good quality long Bragg reflection gratings are difficult to fabricate in optical waveguide because they are typically written in the guide sequentially section by section in short sections that need to be critically positioned with respect to each other to avoid excessive stitch error mediated quality degradation. Additionally, excessive strains are unwelcome because of associated problems of susceptibility to catastrophic failure by fracture.

Consider the general case of a structure for which the delay, expressed as a function of (free space) wavelength has only a zero offset, a linear component and a quadratic component, i.e. a structure that satisfies the relationship:

$$\tau(\lambda)=a_0+a_1\lambda+a_2\lambda^2 \quad (1)$$

The linear dispersion is therefore given by:

$$D(\lambda) = \frac{d\tau}{d\lambda} = a_1 + 2a_2\lambda \quad (2)$$

and the quadratic dispersion by:

$$Q(\lambda) = \frac{dD}{d\lambda} = \frac{d^2\tau}{d\lambda^2} = 2a_2 \quad (3)$$

(Equation (3) shows that, because the differential group delay contains no cubic or higher order term, the quadratic dispersion, Q, is actually a constant, $2a_2$, rather than a term functionally dependent upon wavelength,$\lambda$.) Equation (1) may with advantage be rewritten in terms of the zero offset delay $\tau_0$, the linear dispersion $D_0$, and quadratic dispersion $Q_0$ values ($Q_0$=Q) pertaining to some chosen baseline wavelength $\lambda_0$. This baseline wavelength $\lambda_0$ is typically a wavelength at one end of (or in the middle of) the wavelength range over which dispersion compensation is required. Such a rewriting gives:

$$\tau(\lambda) = \left(\tau_0 - D_0\lambda_0 + \frac{Q_0}{2}\cdot\lambda_0^2\right) + (D_0 - Q_0\lambda_0)\lambda + \frac{Q_0}{2}\cdot\lambda^2 \quad (4)$$

Under the assumption that the delay is produced by a non-linearly chirped Bragg grating in an optical waveguide with an effective refractive index n, each wavelength component $\lambda$ of the incident light is effectively reflected at some specific distance $z(\lambda)$ along the length of the grating. The delay $\tau(\lambda)$ is therefore the folded physical path length (2z) divided by the propagation speed of light in the waveguide (c/n), where c is the in vacuo speed of light.

Hence:

$$\tau(\lambda) = \frac{2n}{c} \cdot z(\lambda) \quad (5)$$

Substituting equation (5) in equation (4) together with:

$$\Delta\lambda = \lambda - \lambda_0 \quad (6)$$

gives:

$$\tau(\lambda) = \frac{2n}{c} \cdot z(\lambda) = \tau_0 + D_0 \cdot \Delta\lambda + \frac{Q_0}{2} \cdot \Delta\lambda^2 \quad (7)$$

Equation (7) is a quadratic equation in $\Delta\lambda$ whose solution, under the condition that $z=0$ at $\tau_0=0$, is given by:

$$\Delta\lambda = \frac{-D_0 \pm \sqrt{D_0^2 + \frac{4Q_0 n}{c} \cdot z}}{Q_0} \quad (8)$$

Remembering that the physical pitch, $\Lambda$, of the grating, is related to the Bragg wavelength $\lambda$ by:

$$\lambda = 2n \cdot \Lambda \quad (9)$$

equation (8) also provides a description of the pitch variation of the grating.

Differentiating equation (7) with respect to $\lambda$, and rearranging, gives:

$$D(\lambda) = D_0 + Q_0 \cdot \Delta\lambda \quad (10)$$

Accordingly, a linear dispersion range $\Delta D = D_1 - D_0$ requires a bandwidth:

$$B = \lambda_1 - \lambda_0 = \frac{\Delta D}{Q_0} \quad (11)$$

Substituting equation (11) in equation (7) to find the granting length, $\Delta z$, gives:

$$\Delta z = \frac{c}{4nQ_0}(2D_0 \cdot \Delta D + \Delta D^2) \quad (12)$$

Equation (12) defines the length of a grating that is required to meet a given design specification. For instance, assuming $n=1.5$, and that a linear dispersion range from $D_0=100$ ps/km to $D_1=500$ ps/km is required with a quadratic dispersion mediated receiver sensitivity penalty limited by limiting the quadratic dispersion to $Q_0=20$ ps/km$^2$; equation (12) determines that the grating must be 600 mm long. For many application this is inconveniently long, and moreover would involve excessive stretching to cover the full range (a strain range of approximately 1.2% for operation in the wavelength region of 1550 nm). Increasing the quadratic dispersion limit by a factor of ten to $Q_0=200$ ps/km$^2$ reduces the grating length, and the strain range, each by a factor of ten, but only achieves this at the expense of a significant increase in receiver sensitivity penalty.

SUMMARY OF THE INVENTION

An object of the present invention is to provide a way of cancelling, at least in part, the receiver sensitivity penalty of an adjustable linear dispersion compensator that employs a waveguide provided with chirped Bragg reflection grating that has a quadratic component of chirp.

According to a first aspect of the present invention, there is provided a method of providing adjustable linear dispersion by causing light to make first and second spectrally distributed reflections respectively in first and second optical waveguides provided with associated first and second chirped Bragg grating reflectors having quadratic components of chirp of opposite sign and substantially matched modulus, each Bragg grating reflector having an effective pitch which is a function of position along that Bragg grating reflector, and which is the product of its physical pitch at that position with the effective refractive index of the waveguide associated with that Bragg grating reflector, in which method an adjustment of linear dispersion is provided by a differential scaling of the effective pitches of the two Bragg grating reflectors.

Since physical pitch and waveguide effective refractive index both contribute to the effective pitch of a Bragg grating reflector, a scaling of its effective pitch, a multiplication by some numerical factor not equal to 1, is achievable by either of these parameters, or of both parameters in combination, a scaling of the effective pitch, resulting at least predominately from a scaling of the physical pitch is obtainable by the application of stress to produce axial strain in the fibre, typically tensile strain. On the other hand, in the case of a polymer optical waveguide (which may be, but is not necessarily, a polymer optical fibre waveguide) a scaling of the effective pitch, resulting at least predominately from a scaling of the effective refractive index of the waveguide is obtainable by changing its temperature. In this instance use is being made of the fact that the temperature coefficient of polymer optical waveguide (dn/dT) is generally much larger than that of silica waveguide.

In the case of a Bragg reflective grating formed in a silica optical fibre waveguide, such a waveguide may be a standard silica fibre waveguide, or it may be a silica fibre waveguide of a composition providing enhanced photosensitivity.

According to a second aspect of the present invention, there is provided a method of providing adjustable linear dispersion by causing light to make first and second spectrally distributed reflections respectively in first and second optical waveguides provided with associated first and second differentially strainable chirped Bragg grating reflectors having quadratic components of chirp of opposite sign and substantially matched modulus. device exhibiting linear dispersion of adjustable magnitude, which device includes first and second optical waveguides provided with respective first and second chirped Bragg reflection gratings and is arranged to define an optical transmission path that includes a reflection in both gratings, wherein the first waveguide is mechanically coupled with a strain applicator adapted to impart to the first waveguide, over the length of its Bragg grating, a substantially uniform axial strain of adjustable magnitude, and wherein the first and second gratings have quadratic components of chirp of opposite sign and substantially matched modulus.

According to a fourth aspect of the present invention, there is provided a device exhibiting linear dispersion of adjustable magnitude, which device includes first and second optical waveguides provided with respective first and second chirped Bragg reflection gratings and is arranged to define an optical transmission path that includes a reflection in both gratings, and also includes a thermal regulator adapted to maintain a uniform temperature difference between said first and second chirped Bragg reflection gratings of adjustable magnitude, and wherein the first and second gratings have quadratic components of chirp of opposite sign and substantially matched modulus.

Other features and advantages of the invention will be readily apparent from the following description of preferred embodiments of the invention, from the drawings and from the claims.

BRIEF DESCRIPTION OF THE DRAWINGS

FIGS. 2 and 3 are representative plots illustrating how differential group delay, τ, varies as a function of Bragg reflection wavelength, λ, in respect of different combinations of linear and quadratic chirp.

DETAILED DESCRIPTION OF PREFERRED EMBODIMENTS

Figure 1:
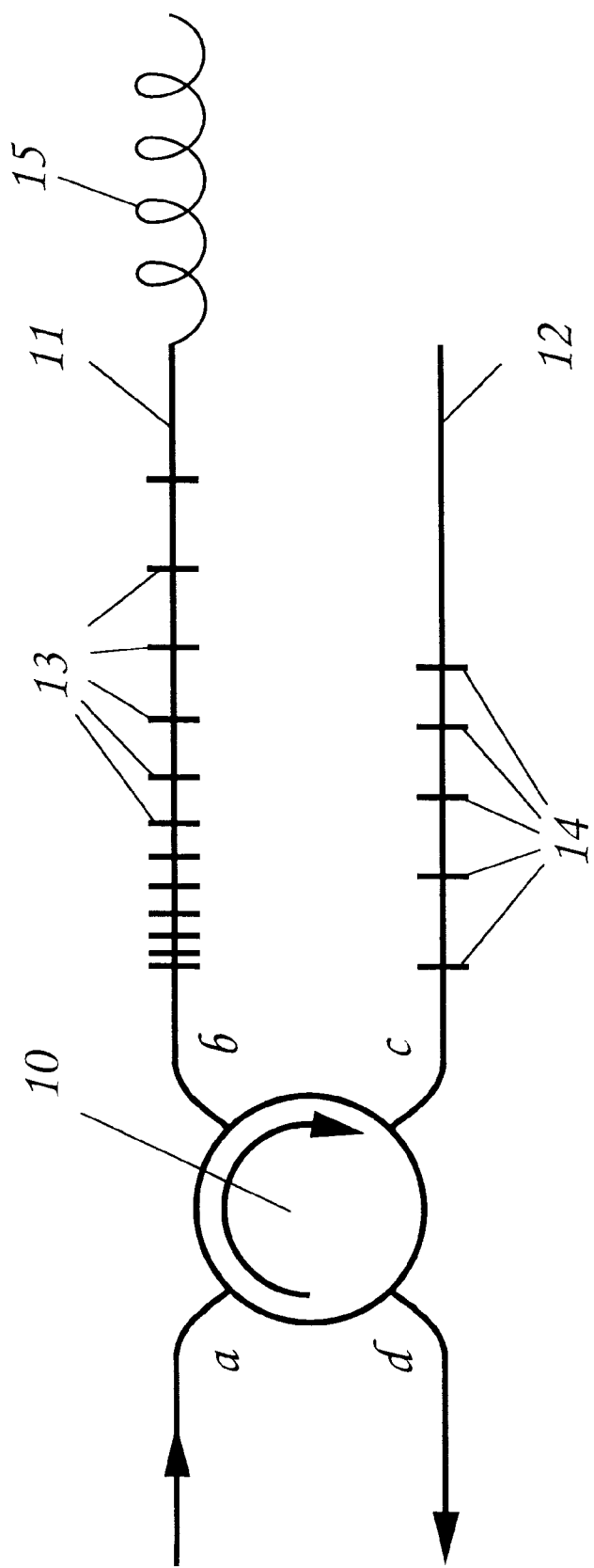
FIG. 1 is a schematic diagram of an adjustable dispersion compensating device embodying the invention in a preferred form.

The adjustable dispersion compensation device of FIG. 1 has three principal components: a four-port circulator 10, two optical fibres 11 and 12 provided with respective chirped Bragg reflective gratings 13 and 14, and some form of adjustable tensile (and/or compressive) strain applicator 15 for axially straining waveguide 11 uniformly over the length of its grating 13 (this strain applicator being symbolically represented in this Figure by a helical spring). Light that enters the circulator 10 by way of its port 'a' emerges by way of its port 'b', to which fibre 11 with its grating 13 is optically coupled. The light that is reflected by this grating 13 re-enters the circulator by way of port 'b', and re-emerges by way of its port 'c', to which fibre 12 with its grating 14 is optically coupled. The light that is reflected by this grating 14 re-enters the circulator by way of port 'c', and re-emerges by way of its port 'd'. If desired, the rotation sense of the circulator 10 can without problem be reversed so that the reflection in the fixed grating occurs before that in the adjustable on instead of after it.

FIGS. 2 and 3 depict how differential group delay, τ, varies as a function of Bragg reflection wavelength, λ, in respect of different combinations of linear and quadratic chirp. In the case of linear chirp with no attendant quadratic chirp, the relationship is depicted by linear trace 20 of FIG. 2 in respect of positive linear chirp, and by linear trace 30 of FIG. 3 in respect of negative chirp. Traces 21 and 31 show the effect of adding a positive component of quadratic chirp respectively to the linear chirps of traces 20 and 30. Correspondingly, traces 22 and 32 show the effect of adding a negative component of quadratic chirp.

Figure 4:
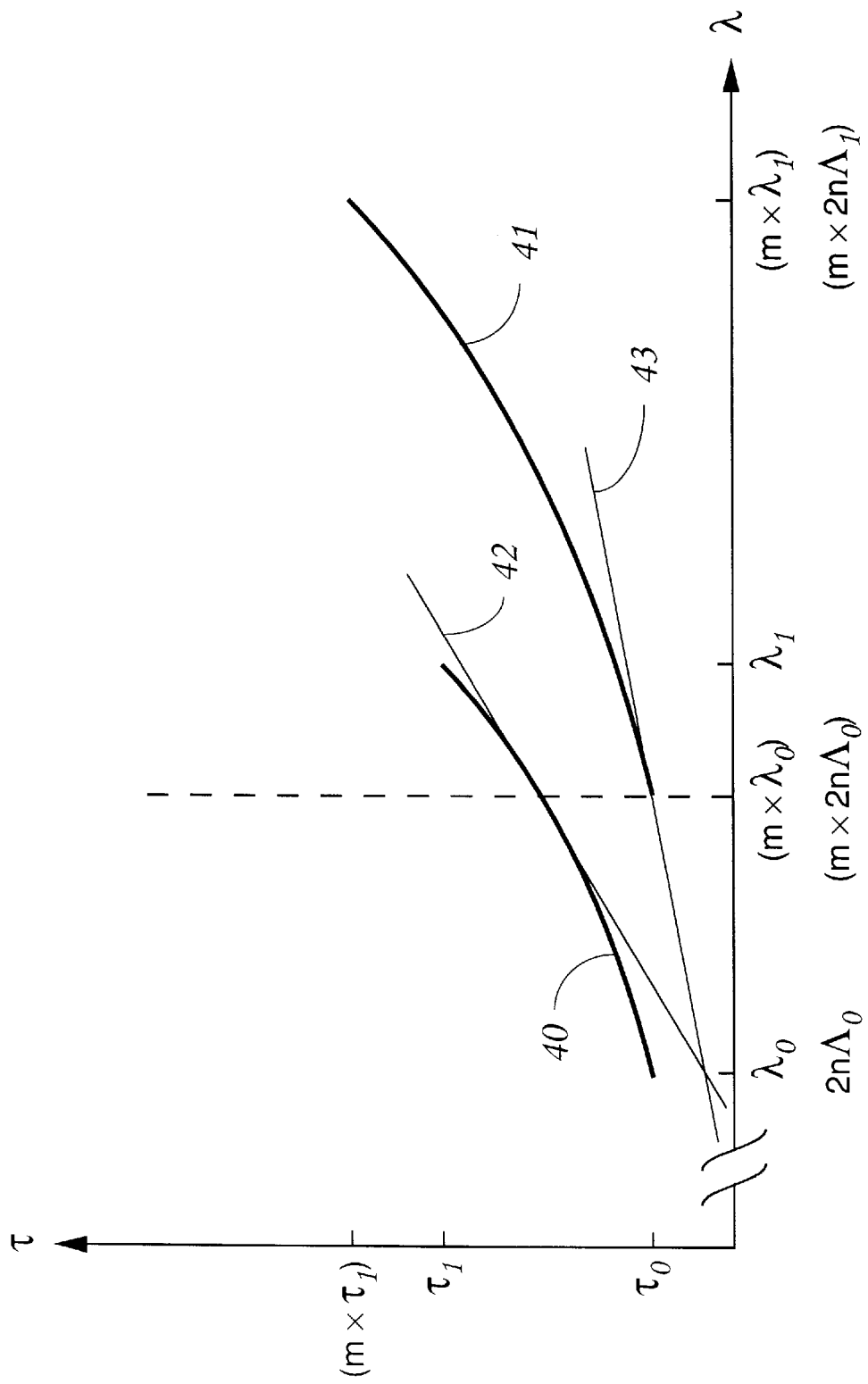
FIG. 4 is a representative plot illustrating how dispersion provided by an optical waveguide with a linearly and quadratically chirped Bragg reflective grating is altered by a scaling of its effective pitch, for instance by an axial stretching of that waveguide.

FIG. 4 shows the effect of stretching a grating that has positive linear chirp and positive quadratic chirp over the range of Bragg reflection wavelengths from $\tau_0$ to $\lambda_1$. In the unstretched condition, the way the differential group delay, τ, varies as a function of Bragg reflection wavelength, λ, is represented by trace 40. If that portion of the fibre extending between the first and last grating elements of the fibre is now stretched by an extension factor 'm', where $\lambda_0 < (m \times \lambda_0) < \lambda_1$, the delay to the beginning of the grating remains unchanged at $\tau_0$, and now the way the differential group delay, τ, varies as a function of Bragg reflection wavelength, λ, is represented by trace 41. The grating pitch at this end is however expanded by the extension factor 'm' from $\Lambda_0$ (where $\Lambda_0 = \lambda_0/2n$) to $m \times \Lambda_0$. Accordingly trace 41 is an m-fold expanded replica of trace 40, with its commencement point shifted in the direction of the λ axis from the point with the co-ordinates $(\lambda_0, \tau_0)$ to that with the co-ordinates $(m\lambda_0, \tau_0)$. Light of wavelength $m\lambda_0$ is reflected in the fibre at the point at which the grating pitch is $2n \times m\Lambda_0$. The linear dispersion, $d\lambda/d\tau$, at this wavelength is given by the gradient of the differential group delay characteristic at this wavelength. In the case of the unstretched fibre, this is the gradient of the line 42 which is tangential to trace 40 at $\lambda = m\lambda_0$. In the case of the stretched fibre, this is the gradient of the line 43 which is tangential to trace 41 at $\lambda = m\lambda_0$. It is thus seen that the effect of the stretching has been to reduce the magnitude of the linear dispersion.

The stretch-induced transition from trace 40 to trace 41 is accompanied by a very small change in quadratic dispersion, a change proportional to the magnitude of the induced strain (~0.1%). Whilst this is small enough to be insignificant, it can, if desired, be compensated by introducing higher order terms in the dispersion characteristic, such that the quadratic dispersion is constant at the particular wavelength of operation for all values of strain exerted.

Reverting attention to FIG. 1, the chirp of grating 13 has non-zero (positive or negative) terms of both linear and quadratic chirp (but no significant magnitude higher order terms). Its differential group delay characteristic therefore has the general shape either of traces 21 of FIG. 2 and 40 of FIG. 4, or that of trace 22 of FIG. 2 or either of traces 31 and 32 of FIG. 3. The chirp of grating 14 also has a non-zero term of quadratic chirp (and similarly, no significant magnitude higher order terms). The modulus of this quadratic chirp is substantially matched with that of grating 13, but the two are of opposite signs so that the contribution of quadratic dispersion imparted to light reflected in the grating 13 of fibre 11 is substantially cancelled out by that imparted to the light when it is reflected in the grating 14 of fibre 12.

By way of a specific example, the grating 13 may be an approximately 60 mm long grating designed for operation to provide a positive value of linear dispersion adjustable, by a stretching of the fibre 11, over the range $D_0 = +100$ ps/nm to $D_1 = +500$ ps/nm, and having a positive quadratic dispersion $Q_0 = +200$ ps/nm$^2$. The pitch of the grating elements increases, with increasing distance from the circulator, to a value providing a Bragg reflection wavelength, λ, just exceeding the design wavelength band for which dispersion compensation is required, typically a waveband in the vicinity of 1550 nm. The grating 14 has a quadratic component of chirp of substantially matching modulus, but opposite sign (i.e. $Q_0 \approx -200$ ps/nm$^2$). Its length can be shorter than that of grating 13 because it needs only be long enough to compass the waveband of operation. Its linear component of chirp may be of either sign. It may be preferred to make it (as depicted in FIG. 1) of opposite sign to that of the grating 13, and of an intermediate modulus, so that operational adjustment of the dispersion afforded by grating 13 enables the aggregate dispersion afforded by the two gratings to range from a negative value to a positive one.

It is clear that, instead of fibres 11 and 12 being connected to consecutive ports of a single 4-port circulator, fibre 11 could be connected to one port of one of a pair of series-connected 3-port circulators while fibre 12 is connected to a corresponding port of the other 3-port circulator. This provides a structure bearing superficial resemblance to the structure described by T Komukai et al., 'Fabrication of nonlinearly chirped fiber Bragg gratings for higher-order dispersion compensation', OFC '98 Technical Digest, Tuesday Afternoon, TuM2, pp 71–2. Closer examination quickly reveals that the two structures are, however, designed for quite different applications, and in consequence thereof are physically quite different. In particular, whereas the present invention requires its two gratings to have quadratic chirp components of opposite sign, the two gratings of the T Komukai et al. structure are required to have quadratic chirp components of the same sign. The fact that the T Komukai et al. structure employs gratings with the same sign of quadratic chirp component can be readily deduced from an examination of the relative curvatures of traces A and B of their FIG. 2, or alternatively by differentiation of their equations 6 and 7.

Figure 5:
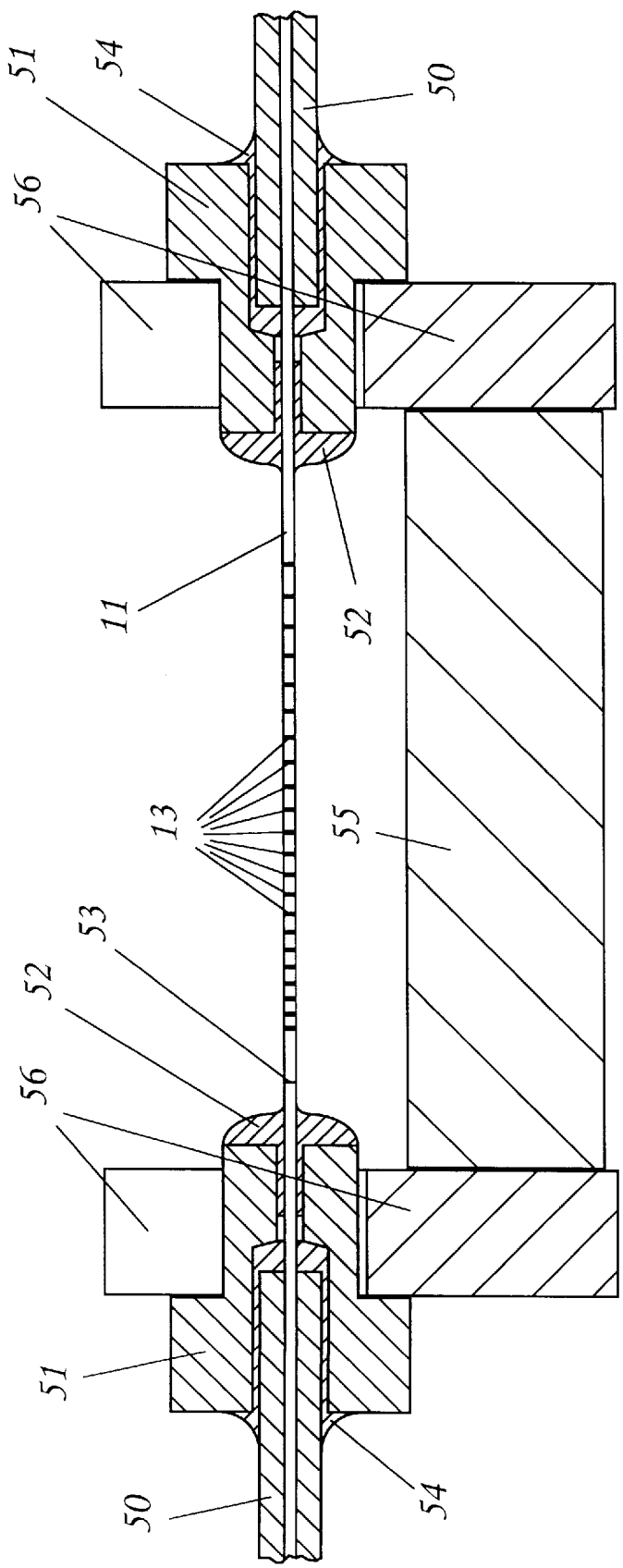
FIG. 5 is a schematic diagram of an optical fibre waveguide with a chirped Bragg reflective grating, together with a jig for axially stretching that waveguide.

A jig for axially stretching the optical fibre waveguide 11 and its grating 13 is schematically depicted in FIG. 5. The fibre 11 is a 125 μm diameter single-mode glass optical fibre provided with a 250 μm diameter plastics protective coating 50. A portion of this cladding is stripped from the fibre 11 so as to enable the writing therein of the Bragg reflection grating 13. Tension for axially straining the grating is applied to the fibre by way of a pair of flanged ferrules 51 directly attached to the fibre 11 by way of low expansion solder-glass fillets 52. A suitable solder-glass for this purpose comprises a lead oxide matrix in which has been dispersed a high melting point low-expansion filler. The ferrules 51 are made of a low thermal expansion iron nickel cobalt manganese alloy suited to the making of glass-to-metal seals. In this instance the design calls for the thickness of the solder-glass lying inside the bore of each of these ferrules to be less than the thickness of the plastics coating 50, and so, although each ferrule is counterbored to allow entry of the coating part-way into the ferrule, a ferrule can not be transported all along the plastics coated fibre from a remote end. Accordingly, the portion of bare fibre 11 that includes the Bragg reflection grating 13 also has to include a splice 53. (The need for the splice 53 can be avoided by the use of a redesigned ferrule (not shown) with a uniform bore large enough to accommodate the fibre 11 complete with its plastics protective coating 50.) The two ferrules 51 can then be introduced over their respective ends of bare fibre before this splice is made. Preferably the material that goes to form the solder-glass fillets is applied in the form of preforms (not shown), one for each ferrule, in which case these preforms are introduced over the ends of bare fibre at the same time as the ferrules. Conveniently, such a preform is located in abutment with the end face of its associated ferrule while that ferrule is heated by an induction heater (not shown). Sufficient heat is conducted into the preform from the ferrule to cause that preform to melt and flow by capillary action at least part-way down the small-bore portion of that ferrule. After the ferrules 51 have been secured to the fibre 11 by the solder-glass fillets 52, adhesive resin may be dispensed into the ferrule counterbores to form fillets 54 securing those ferrules also to the respective end portions of the plastics cladding 50 on the fibre 11.

The jig has an expander unit 55 between a pair of slotted end plates 56 into which the ferrules 51 are engaged so that, when the expansion unit is expanded, these end plates bear upon the ferrule flanges so as to tension the intervening portion of fibre 11. The precise form of expansion unit employed is not critical. The expansion unit may for instance comprise a piezoelectric stack. It may be solenoid operated. If the speed of operation is not too critical, it could be a thermal expansion type device.

Figure 6:
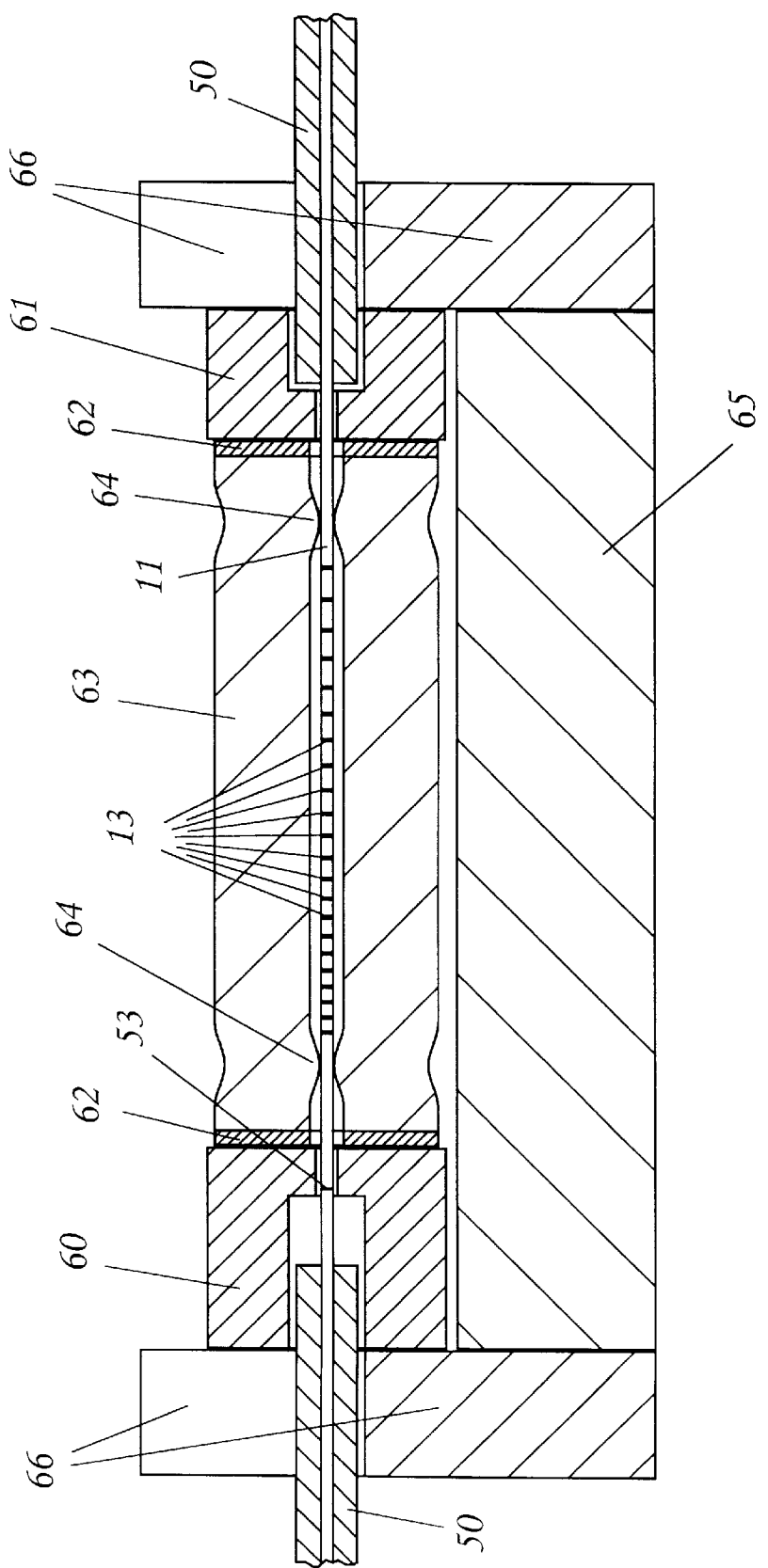
FIG. 6 is a schematic diagram of an optical fibre waveguide with a chirped Bragg reflective grating, together with a jig for axially compressing that waveguide.

Typically tensile straining of the fibre 11 is more readily accomplished than compressive straining. However, there can be circumstances in which tensile straining is not acceptable. An example of a jig for axially compressing the optical fibre waveguide 11 and its grating 13 is schematically depicted in FIG. 6. In the case of this jig the fibre 11 similarly has to include a splice 53 in order to allow components to be threaded on to the bare fibre before the splice is made. These comprise first and second ferrules 60 and 61, a pair of load-spreading washers 62 (optional), and a length of thick-walled capillary sleeving 63.

One function of the sleeving 63, which is typically made of silica, is to inhibit bending of the fibre when it is subjected to compressive stress in the axial direction. Its bore is therefore only just large enough to admit the free passage of the fibre 11. A second function of the sleeving is to provide a point of attachment to the fibre near each end so that compressive strain of the sleeving resulting from the application of axially directed compressive stress is transferred across to the fibre. These two points of attachment are provided at 64 where the sleeving has been locally heated to collapse it on to and fuse with the fibre.

The jig of FIG. 6 has a compression unit 65 (the counterpart to the expander unit 55 of the jig of FIG. 5) between a pair of slotted end plates 66 (the counterpart to the end plates 56 of the jig of FIG. 5) into which the fibre 11, complete with its plastics cladding 50, is engaged so that, when the compression unit contracts, these end plates bear upon the ferrules 60 and 61 so as to compress the sleeving 63, and thereby intervening portion of fibre 11 lying between its points of attachment 64 with the sleeving.

The function of the load-spreading washers 62, if employed, is to yield just sufficiently to reduce any pressure nonuniformities occasioned by local proud spots on the (nominally flat) facing end surfaces of the sleeving and adjacent ferrules, thereby reducing risk of stress fracture. These washers may be of copper.

Figure 7:
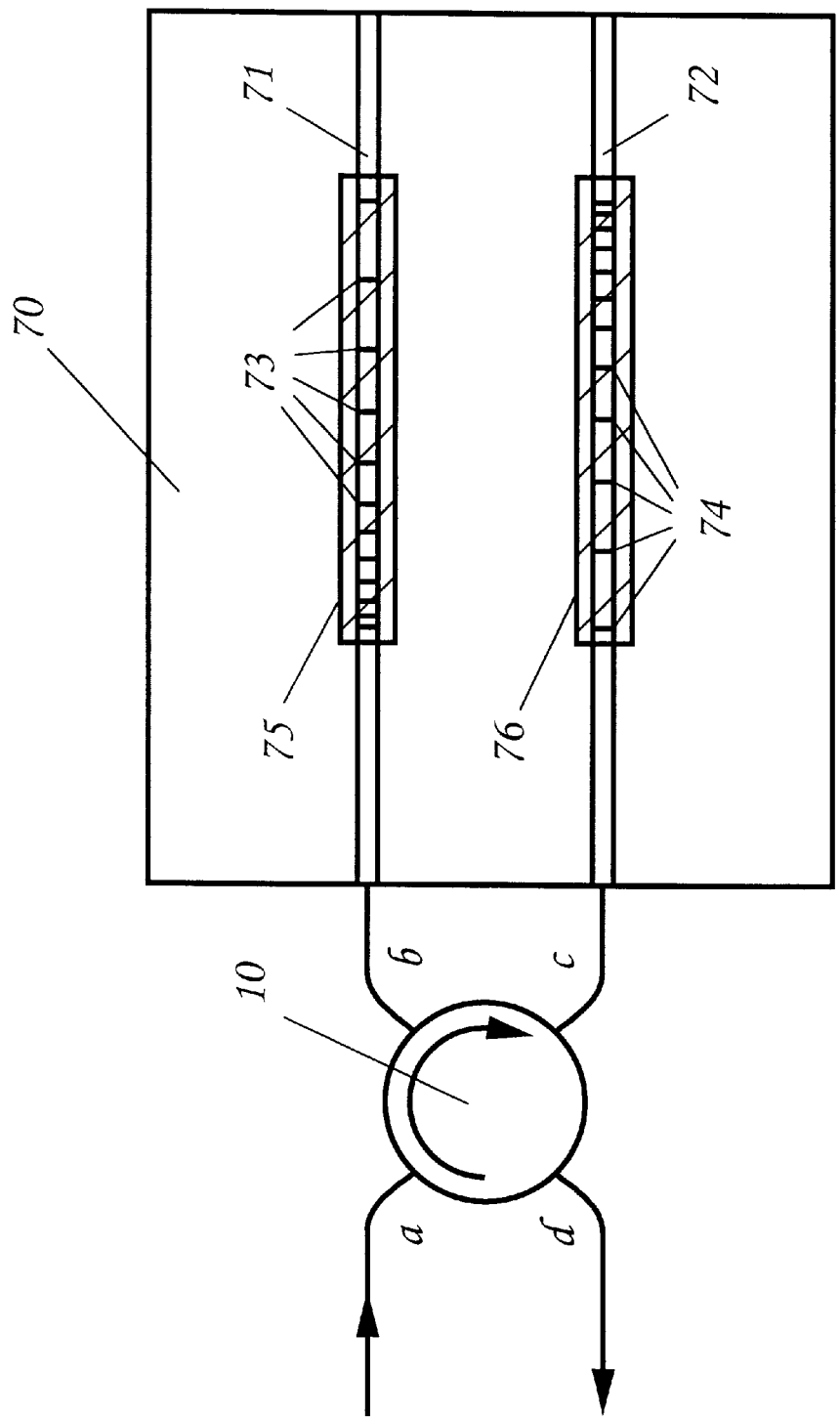
FIG. 7 is a schematic diagram of an adjustable dispersion compensating device embodying the invention in an alternative preferred form that effects adjustability thermally instead of through the agency of strain.

The preferred embodiments described above with particular reference to FIGS. 1, 5 and 6 have been embodiments that rely upon inducing a change in the physical pitch of a Bragg reflection grating, but it has already been explained that an equivalent dispersion adjustability can be obtained by inducing a change in the effective refractive index of a waveguide in which the Bragg reflection grating is formed. An example of this approach is schematically depicted in FIG. 7. This embodiment used the same arrangement of circulator 10 employed in the device of FIG. 1, but its ports b and c are optically coupled with a pair of polymer waveguides 71 and 72 formed on an integrated optics substrate 70. In these waveguides are created a pair of Bragg reflection gratings 73 and 74 having chirp properties similar to those of their counterpart gratings 13 and 14 of the device of FIG. 1. Each of the gratings 73 and 74 is provided with an associated thermo-electric heater/cooler 75 and 76 providing the facility for operation of the device in push-pull mode by maintaining one grating at a uniform temperature different by an adjustable magnitude from that at which the other grating is maintained. The gratings are preferably matched gratings of substantially matched length, one being in inverted relationship with respect to the other so as to provide them with quadratic chirp terms of opposite sign. (Such an inverted relationship is, of course, not the case if the two waveguides 71 and 72 are instead fed from opposite ends.) An adjustment range of reduced magnitude is provided if one of the heater/coolers is dispensed with, and a further reduction of adjustment range is provided if that single remaining heater/cooler is replaced with a simple heater, such as a Joule heater.

A separate dispersion compensator will typically be required for each separate channel of a WDM transmission system. Using dispersion compensators specifically as described above with particular reference to FIGS. 1 and 5 or 6 or to FIG. 7 would typically require a separate grating design for each specific channel. However, a reduction in inventory is possible by a special periodic modulation of the coupling coefficients of the grating elements of the to produce 'sampled Bragg reflective gratings' (also known as 'superlattice Bragg reflective gratings'). The properties of such sampled gratings are described for instance by B J Eggleton et al. in, 'Long periodic superstructure Bragg gratings in optical fibres', Electronics Letters, Vol. 30, No. 19, pp 19–21; and by M Ibsen et al. in, '30 dB sampled gratings in germanosilicate planar waveguides', Electronics Letters, Vol. 32, No. 24, Nov. 21, 1996. By such modulation of the coupling coefficients of the grating elements, it is possible to produce a repeating quadratic dispersion characteristic with a periodicity chosen to be sufficiently larger than the bandwidth of the unmodulated grating so as to leave small guard-spaces between the periods in wavelength space. A small effective grating period adjustment can then be made to bring one of the periods into appropriate wavelength registry with the waveband of any selected one of the wavelength channels of the WDM signal. In instances where both gratings are sampled gratings, generally both such sampled gratings will need to be effective pitch adjustable gratings so that each is capable of being 'tuned' to move any guard-space out of its wavelength range of operation.

What is claimed is:

1. A method of providing adjustable linear dispersion by causing light to make first and second spectrally distributed reflections respectively in first and second optical waveguides provided with associated first and second chirped Bragg grating reflectors having quadratic components of chirp of opposite sign and substantially matched modulus, each one of said Bragg grating reflectors having an effective pitch which is a function of position along said Bragg grating reflector, and which is a mathematical product, which mathematical product is the mathematical product of its physical pitch at that position with a value of effective refractive index, which value of effective refractive index is the value of the effective refractive index of the waveguide associated with said Bragg reflector, in which method an adjustment of linear dispersion is provided by a differential scaling of the effective pitches of the two Bragg grating reflectors.

2. A method as claimed in claim 1, wherein said differential scaling is effected by a differential axial straining of the two Bragg grating reflectors.

3. A method as claimed in claim 1, wherein said differential scaling is effected by a differential heating of the two Bragg grating reflectors.

4. A method as claimed in claim 1, wherein the Bragg grating reflectors are sampled Bragg grating reflectors.

5. A method of providing adjustable linear dispersion by causing light to make first and second spectrally distributed reflections respectively in first and second optical waveguides provided with associated first and second differentially strainable chirped Bragg grating reflectors having quadratic components of chirp of opposite sign and substantially matched modulus.

6. A method as claimed in claim 5, wherein the Bragg grating reflectors are sampled Bragg grating reflectors.

7. A device exhibiting linear dispersion of adjustable magnitude, which device includes first and second optical waveguides provided with respective first and second chirped Bragg reflection gratings and is arranged to define an optical transmission path that includes a reflection in both gratings, wherein the first waveguide is mechanically coupled with a strain applicator adapted to impart to the first waveguide, over the length of its Bragg grating, a substantially uniform axial strain of adjustable magnitude, and wherein the first and second gratings have quadratic components of chirp of opposite sign and substantially matched modulus.

8. A device as claimed in claim 7, wherein the Bragg grating reflectors are sampled Bragg grating reflectors.

9. A device as claimed in claim 7, wherein the first and second waveguides are optical fibre waveguides.

10. A device as claimed in claim 7, wherein the strain applicator imparts adjustable magnitude tensile strain to the first waveguide over the length of its Bragg grating.

11. A device as claimed in claim 7, wherein the strain applicator imparts adjustable magnitude compressive strain to the first waveguide over the length of its Bragg grating.

12. A device exhibiting linear dispersion of adjustable magnitude, which device includes first and second optical waveguides provided with respective first and second chirped Bragg reflection gratings and is arranged to define an optical transmission path that includes a reflection in both gratings, and also includes a thermal regulator adapted to maintain a uniform temperature difference between said first and second chirped Bragg reflection gratings of adjustable magnitude, and wherein the first and second gratings have quadratic components of chirp of opposite sign and substantially matched modulus.

13. A device as claimed in claim 12, wherein the Bragg grating reflectors are sampled Bragg grating reflectors.

14. A device as claimed in claim 12, wherein said first and second optical waveguides are polymer waveguides.

* * * * *